April 16, 1957  J. R. NICHOLS  2,789,165
PROGRAM CONTROL MECHANISM
Filed May 26, 1954  7 Sheets-Sheet 1

Fig. 5.

| DRUM STATION | CYCLE | | SPINDLE | | | | TOOL SLIDES | | | | | Column descriptions |
|---|---|---|---|---|---|---|---|---|---|---|---|---|
| | DRUM RETURN | TIME DELAY | DRIVE | CLUTCH A | CLUTCH B | CLUTCH C | CARRIAGE | FRONT CROSS SLIDE | REAR CROSS SLIDE | SADDLE | | |
| | OFF ON | ON OFF | ON STOP REV LOW HIGH | LOW HIGH | LOW HIGH | LOW HIGH | LFT RT | OUT IN | IN OUT | LFT RT | | |
| 0 | ← | ← | ← | ← | ← | ← | ← | ← | ← | ← | | ALL SLIDES RETRACTED READY TO START |
| 1 | | | ← | | | | | | | ← | | SPINDLE STARTS SADDLE MOVES TO LEFT AND DRILLS ON FACE #1 |
| 2 | | | | ← | | | ← | | | ← | | SADDLE RETURNS, INDEXES TO FACE #2. SPINDLE SPEED INCREASED. CARRIAGE MOVES OUT |
| 3 | | | | | | | | ← | | | | FRONT CROSS SLIDE MOVES IN |
| 4 | | | | | | | ← | | | | | CARRIAGE MOVES IN TO LEFT FOR ROUGH TURN |
| 5 | | | | | | | ← | ← | | | | CARRIAGE AND FRONT CROSS SLIDE MOVE OUT |
| 6 | | | | | ← | | | ← | | | | FRONT CROSS SLIDE MOVES IN. SPINDLE SPEED REDUCED |
| 7 | | | | | | | ← | ← | | | | CARRIAGE MOVES IN TO LEFT TO ROUGH TURN ANOTHER DIAMETER |
| 8 | | | | | | | ← | ← | | | | CARRIAGE AND FRONT CROSS SLIDE MOVE OUT |
| 9 | | | ← | ← | ← | ← | ← | ← | | ← | | CARRIAGE MOVES TO LEFT. SADDLE MOVES LEFT TO BORE. SPINDLE SPEED INCREASED |
| 15 | | | ← | | | | ← | | | ← | | CARRIAGE MOVES IN TO LEFT. SPINDLE STOPS |
| 16 | ← | | | | | | | | | | | DRUM CONTINUES INDEXING TO STATION "0" |

*Fig. 15.*

Inventor
John R. Nichols
by Wright, Brown, Quinby & May,
Attys.

United States Patent Office 2,789,165
Patented Apr. 16, 1957

2,789,165

PROGRAM CONTROL MECHANISM

John R. Nichols, Springfield, Vt., assignor to Jones & Lamson Machine Company, Springfield, Vt., a corporation of Vermont Application May 26, 1954, Serial No. 432,563

8 Claims. (Cl. 200—5)

It is often desirable to provide automatic control of a plurality of mechanisms in predetermined sequence, and throughout a plurality of steps or stages which are largely repetitive. In such cases it is often experienced that the desirable changes in control from one to a succeeding step or stage are relatively few in number. In setting up such a program control mechanism it is therefore simple to set up the controls for each stage identical with those of the preceding stage and then to change only those relatively few controls which should differ from those of the preceding stage.

This invention, therefore, provides means by which, the desired controls for one stage having been properly set up, the controls for the following stage may be automatically set up identical therewith, after which any controls which should differ from the similar controls of the previous stage can be changed as desired for that particular stage. The controls for the next stage are then automatically set up corresponding to the finally adjusted controls for the last stage, after which individual controls may be changed as desired for such next stage.

In order to more fully disclose this invention it is exemplified in the accompanying drawings as embodied in a control mechanism for a turret lathe provided in addition to the turret mechanism with front and back tool slides carried by a movable carriage, though it should be understood that the invention in its broader aspects is not limited or restricted to the control of any particular machine or type of machine. In the example shown herein, the turret may be carried on the usual ram which is movable lengthwise of the work at any selected of three speeds, the fastest being normally the speed by which a selected tool on the turret is moved toward or retracted from a work piece, the slower speeds being, either of two working speeds during which the tool selected is operating on the work piece, the turret being turned by a predetermined amount when retracted to present the tools thereon successively into operative angular positions for succeeding motions of the turret toward the work. Certain of the turret positions may be skipped, if desired. The front and back tool slides may also be given motion toward and from the work piece at either a fast idle speed or a slower working speed and they may be moved also lengthwise of the work axis by movement of the tool carriage, and the work piece which is carried by a rotary spindle may be rotated selectively at any of a plurality of speeds.

All of these motions and selection of speeds, and, if desired, with time delays, may be set up for automatic selection by program control mechanism of the type illustrated, and the number of controlled factors may be very large if desired, or if less than all the controls provided for are to be used, the control mechanism may be made to skip any position where such control would, if used, be positioned.

For a more complete understanding of this invention, reference may be had to the accompanying drawings in which:

Figure 10 is a detail sectional view on line 10—10 of Figure 4.

Figure 11 is a view similar to a portion of Figure 10, but showing the parts in different positions.

Figures 12 and 13 are detail sectional views on lines 12—12 and 13—13, respectively, of Figure 11.

Figures 10a and 13a are views similar to portions of Figures 10 and 13, respectively, but showing a modified construction.

Figure 14 is a detail sectional view on line 14—14 of Figure 12.

Figure 1:
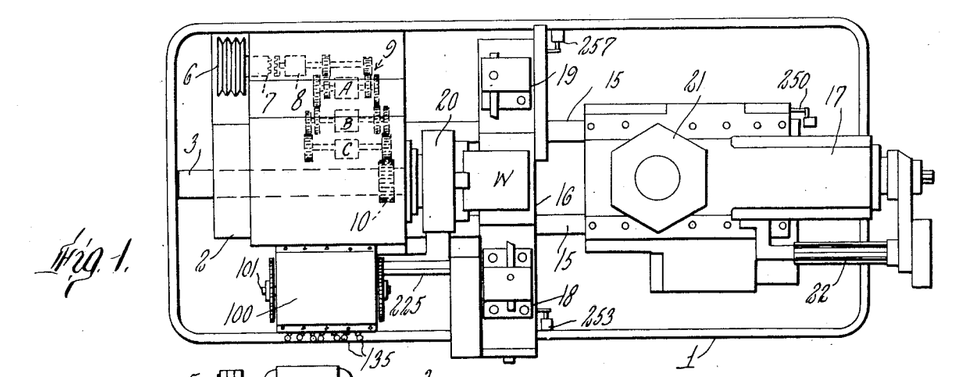
Figures 1 and 2 are top plan and front elevational views, respectively, of a turret lathe which it is desired to control.
Figure 2:
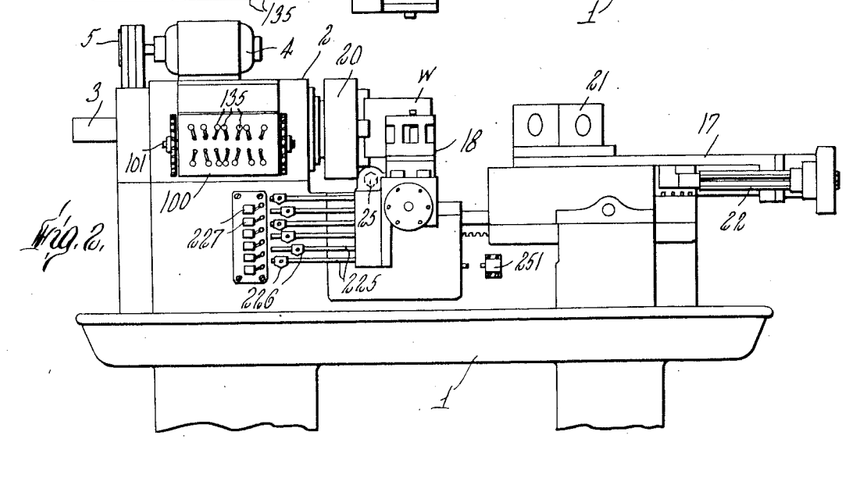

The program control mechanism is shown herein by way of example as arranged to control various functions of a lathe, the lathe being illustrated particularly in Figures 1 and 2 of the drawings. It comprises a bed 1 at one end of which there is mounted a headstock 2. The headstock 2 has journaled therein a rotary work-carrying spindle 3 which is arranged to be rotated at any one of three speeds.

The spindle drive is produced from a motor 4 which is belt connected from a motor pulley 5 to a drive pulley 6. Interposed between the drive pulley 6 and the spindle 3 is a clutch 7, a brake 8 which may be applied when the clutch is disconnected, and a train of gearing indicated generally at 9 leading to a gear 10 carried by the spindle 3. The gears of the train 9 may be coupled in various relations to give any selected of a considerable number of speeds. The coupling means may comprise hydraulic clutch mechanisms A, B and C having high and low speed clutches combinable together in various combinations and which may be controlled selectively. Such mechanisms are well known in the art and hence no detailed description is believed necessary here, it being only necessary to point out that by energization of the various mechanisms A, B and C in various relations, the desired speeds are selected for driving the spindle 3.

The lathe is also provided with longitudinal ways 15 on which are longitudinally slidable a carriage 16 and a saddle 17. The carriage 16 supports front and back tool slides 18 and 19 which are mounted for independent motion toward and from the work piece W positioned therebetween and held by a suitable chuck 20 secured to the rotary spindle 3.

The saddle 17 may carry an indexable turret 21 which may support tools on its various faces which may be rendered operative in sequence under the control of an indexable lay shaft 22. The controls of this lay shaft may be as shown in the Gamble Patent No. 2,562,266 dated July 31, 1951. It is sufficient for the purpose of this invention to state that at each reciprocating motion of the saddle the lay shaft is indexed to bring a different set of controls to bear which determine the particular tools of the turret which are to be presented on the next inward stroke of the saddle and also determine the limit of inward feed of this saddle and finally retract it.

Each of the slides 18 and 19 may also be equipped with a similar lay shaft 25 which may be indexed at each retraction of the corresponding slide, these lay shafts having means for determining independently at each index position the inward limit of motion of the corresponding tool slide and controlling the initiation of the retraction of such slide. One or both of the slides 18 and 19 may, however, be otherwise equipped as will later appear. It will therefore be seen that each of the front and back tool slides is capable of two tooling motions, the one being longitudinal of the axis of the work piece by longitudinal movement of the carriage, and the other comprising a feed and retracting motion of each individual tool slide independently of the other.

All these various motions of the carriage, saddle, and tool slides and the speed of the spindle may be controlled in suitable timed relation by the control mechanism which forms the subject matter of this invention.

Figures 10, 10A, 11, 12, 13A, 14, 15:
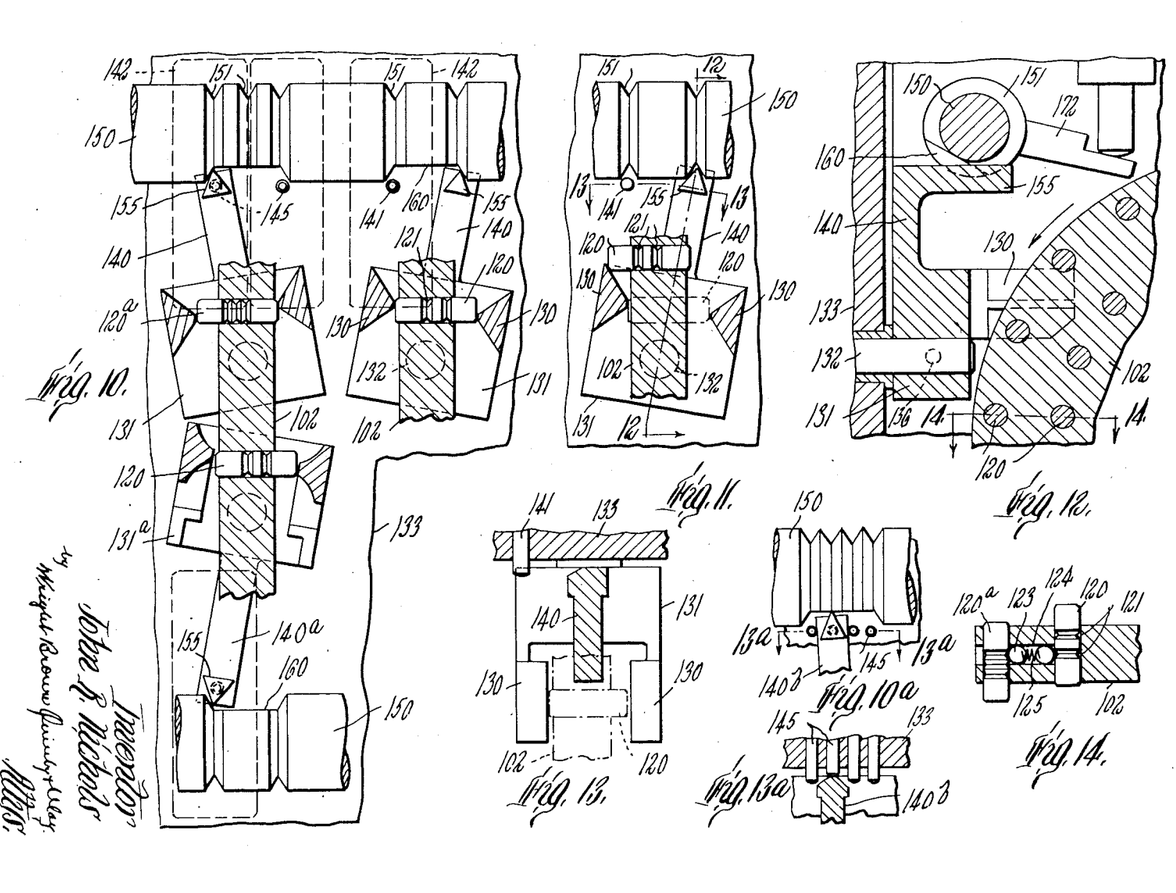
Figure 15:
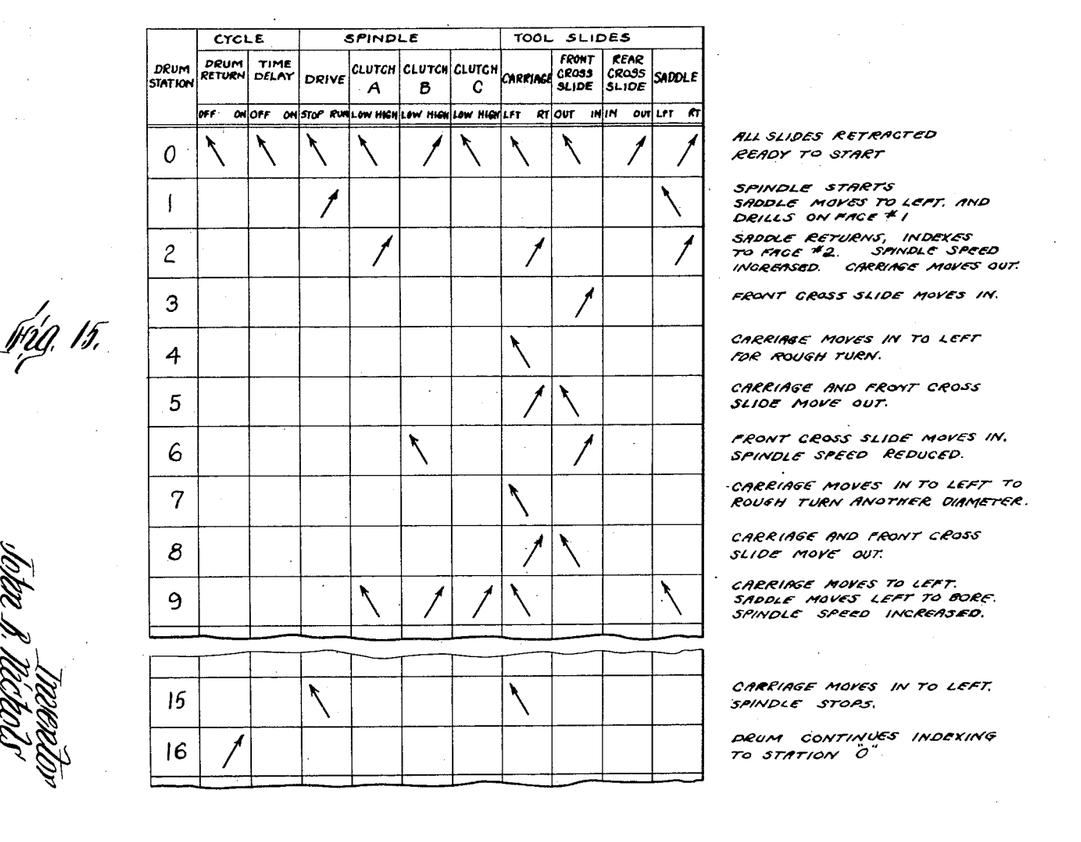
Figure 15 is a diagram showing a representative setting of control lever arrangements.

The control mechanism is shown as enclosed within a casing 100 which may be placed at any desired location. As shown in Figures 1 and 2, however, it is located on the machine bed adjacent to the headstock. It is shown in detail in Figures 3 to 14, inclusive, and Figure 15 is a diagram showing possible settings for certain controls of the lathe shown in Figures 1 and 2.

Figure 3:
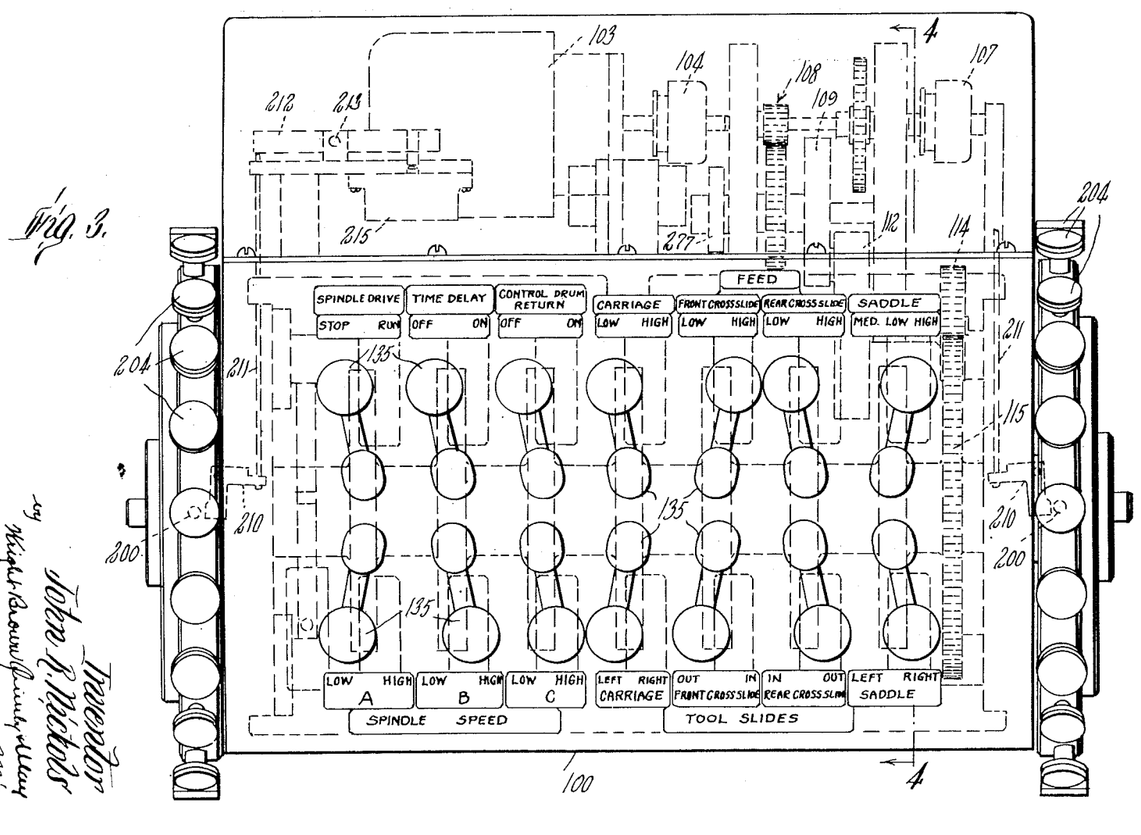
Figure 3 is a view to a larger scale than of a portion of Figure 2 showing the pattern control mechanism.
Figure 4:
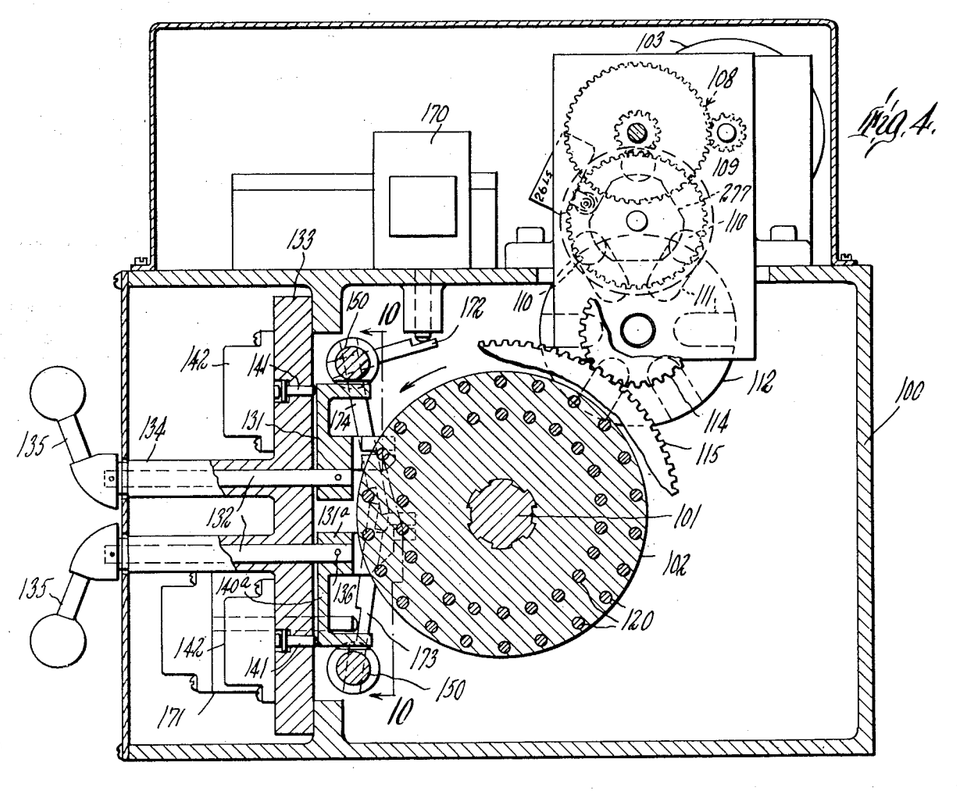
Figure 4 is a sectional view on line 4—4 of Figure 3.

The casing 100 has journaled therein a shaft 101 to which are keyed in parallel spaced relation a plurality of disks 102. The shaft 101 with its disks is arranged to be indexed, and for this purpose there is shown in Figures 3 and 4 an indexing motor 103 connected through a clutch 104, a brake 107 and a train of gears 108, to a Geneva plate 109 provided with Geneva pins 110 which engage in slots 111 in a Geneva wheel 112. This Geneva wheel 112, as shown best in Figure 4, is geared to the shaft 101 through the meshing gears 114 and 115, the gear 114 being turnable with the Geneva wheel 112 and the gear 115 being suitably secured to the shaft 101.

Each of the disks 102 carries a plurality of series of elements 120, two such series being shown, the elements of each series being arranged in circular array concentric with the axis of the shaft 101 and at different radial distances from that axis. Each of the elements 120 is shown as cylindrical, and each is slidable through its supporting disk 102 and may take any one of a number of axial positions therein. The elements 120 shown in Figure 11 and in the right hand portion of Figure 10 are each provided with a pair of peripheral grooves 121, while the upper left hand element 120a of Figure 10 is shown as provided with three such grooves. However, as will later appear, there may be more than three grooves where this is desired. Cooperating with one of these grooves at a time is a spring pressed ball such as 123 shown in Figure 14 which is seated in a socket 124 in the disk 102 and tends by the action of its spring 125 to engage in that one of the grooves 121 which happens to be presented thereto at any time and acts as a latch tending to hold the corresponding element 120 or 120a in any of its axial positions in which it may be. Thus the elements 120 shown in Figure 11, and the right hand portion of Figure 10, and in Figure 14 have two axial positions in each of which the element when placed therein tends to remain by the action of the ball latch 123, while the element 120a shown in the left hand upper portion of Figure 10 and also in Figure 14 has three different axial positions in any of which it tends to be maintained when once placed therein.

Cooperating with these elements 120 and 120a are wedge portions 130 which are spaced apart so that the elements 120 or 120a may be passed therebetween as the shaft 101 is indexed. Each pair of portions 130 is carried by an arm 131 or 131a which is secured to a rock shaft 132 (see Figure 4), the rock shafts 132 being extended through a stationary wall member 133 having sleeve extensions 134 within which the members 132 are rockably mounted. On the outside of the casing 100 each rock shaft 132 has secured thereto a handle 135 (see Figures 1, 3, 4 and 6). As shown best in Figure 4, since there are two series of elements 120 arranged in concentric relation to the shaft 101 and at different distances from the axis thereof, there are two arms 131 and 131a for each disk 102, the upper one 131 as shown in Figure 4, having its portions 130 positioned to cooperate with the elements 120 or 120a in the outer series, while a lower arm 131a is arranged with its element-cooperating portions cooperating with the elements 120 or 120a of the inner series. The parts of the arms to which the pivots 132 are secured, as by pins 136, are spaced sufficiently from the element-engaging portions 130 so that the disks 102 with their elements 120 or 120a are free to be indexed therepast without either series of elements 120 interfering with the angular positions of the arms 131 or 131a which cooperate with the elements of the other series.

Each of the arms 131, as shown best in Figures 4 and 11, has an extension 140 which may engage at suitable angular positions on switch actuating pins 141 to actuate switches such as 142 to either make or break an electric circuit as may be desired in the particular case. As shown, for example, in Figure 10 when an element 120 is in its extreme right hand position the extension 140 is out of contact with any switch actuator 141. Should the element 120 be in its other or left hand axial position and the portions 130 be in engagement therewith, this arm will be swung to its opposite position, depressing the switch pin 141. The arm 131 in the upper left hand portion of Figure 10 may take any one of three positions, depending upon which one of the three axial positions is taken by the element 120a. In either of its extreme positions, its extension 140 depresses a switch actuating pin 145, while in its intermediate angular position it is out of contact with either of the two actuating pins with which this particular arm 131a may cooperate. However, if desired there may be one or more intermediate positions for the extension 140, this being shown, for example, in Figures 10a and 13a where the extension 140b can make contact with any selected of four switch actuating pins 145. Such an arrangement will, of course, necessitate the employment of an element like element 120 but having four peripheral grooves therein to determine that number of angular positions for the controlling arm.

In the left hand portion of Figure 10, the lower arm 131a with its extension 140a may take either of two positions, there being two peripheral grooves in the element 120 which controls it.

It will thus be seen that when the various control arms are free to swing, their positions with respect to their actuating switches are determined by the axial positions of the controlling elements 120 or 120a which happen to be between their respective portions 130 at any particular time in the indexing of the shaft 101 and the disks 102. However, it is possible to lock any of the switch arms 131 and 131a in any of their possible angular positions so that upon indexing of the shaft 101 and the disks, the elements 120 or 120a of a series cooperating therewith are forced into an axial position corresponding to the angular position of the corresponding arm 131, since when the arms 131 are unable to swing, their portions 130 exert wedging pressure on each of the elements 120 or 120a as it passes therebetween to force it into the axial position corresponding to the particular angular position in which the controlling arm is locked.

Means for so locking or releasing the upper and lower arms 130 and 130a simultaneously has been illustrated herein, such means comprising the rock shafts 150 which are journaled adjacent to the outer ends of the extensions 140 and 140a. As shown best in Figures 4 and 10, each of these rock shafts 150 is provided with a plurality of series of peripheral grooves 151 corresponding in numbers and spacing at each lengthwise position of the shaft 150 to the number and spacings of angular positions of the corresponding control arm 140 or 140a. These control arms are shown as being provided with wedge portions 155 which are adapted to engage in the respective grooves 151. Each of the shafts 150 is cut away at a portion of its periphery as shown at 160 and when the corresponding shaft 150 is in such angular relation that the cut away portion 160 comes opposite to the wedge portions 155, as shown in Figures 4 and 10, the arm extensions 140 or 140a may be swung freely so that they may be brought opposite to any selected of the corresponding grooves 151. In this angular position of the shafts 150, arms 131 and 131a are free to be moved to take up any of their desired angular positions. However, each of the rock shafts 150 can be rocked to such a position as shown in Figures 11 and 12 that the cut out portions 160 are out of registry with the portions 155, so that each such portion is restricted to engagement in the particular groove 151 in which it happens to be in when the rock shaft is turned to locking angular position. The rock shaft 150 may be selectively placed in locking or releasing position by the energization of operator-controlled solenoids 170 or 171, respectively, acting upon arms 172 secured to the upper shaft 150 or on an arm 173 secured to the lower shaft 150 and interengaging an arm 174 also secured to the upper shaft 150. The rock shafts are in released position during operation of the control mechanism so that the arms may take up their positions determined by the prior positions of the control elements 120 and 120a.

Each angular position of each of the arms 140 or 141 is arranged to determine a particular function in the control of the machine such as the lathe controlled by this program mechanism. Thus as shown in Figure 3, the two series of arms 131 and 131a may be pre-set to any desired of their possible angular positions to set the mechanism for the lathe or other machine to be controlled in the proper conditions.

Referring to Figure 3, the left hand upper handle is set to "stop" for the spindle drive. The next upper handle to the right is on the "off" position for the time delay which will later be further described. The next handle to the right is set to "off" for the return of the controlling mechanism to starting position. The next handle to the right is set for the low speed of the carriage, the next to the right is for the high speed of the front cross slide, the next on the right for low speed of the rear cross slide, and the right hand upper handle for high speed of the saddle. The lower bank of handles is shown as set for actuation of the spindle at the speed corresponding to the low speed of the "A" clutch, the high speed of the "B" clutch, and the high speed of the "C" cltuch. The carriage is set for motion to the left, the front and rear cross slides are set for outward or retracting motion, and the saddle is set for retraction. If this saddle has its cycle of motion controlled by an indexing lay shaft as shown and as disclosed in the Gamble Patent No. 2,562,266 heretofore mentioned, it will already have been retracted so that the position of the saddle control handle for retraction will have no effect.

The various switches which are actuated or left idle by the various angular positions of the control handles 135 are so connected up to the various machine controls as to produce the desired directions and speeds of travel as shown on the legends on the control casing, and of course will be dependent upon the particular machine to be controlled and the particular portions of the machine where control is desired. As these machine controls per se are not portions of the invention they are not shown herein.

The utility of the mounting of the elements 120 and 120a so that they may assume any selected of a multiple number of axial positions and the provision for locking or releasing the angular positions of the control arms as produced by rocking of the handles 135 and 135a will be apparent from an inspection of Figure 15. For simplicity the speed controls for the carriage, front and back cross slides and for the saddle have been omitted from the diagram of Figure 15, but any changes of speed there are made similar to the changes indicated for the remaining functions. We assume that at the starting position of control it is desired that the time delay at the end of the cycle shall be off, the spindle drive off, the clutch A set for low speed, the clutch B set for high speed and the clutch C for low speed, which combination gives the desired spindle speed when the machine is started. It is further assumed that the carriage is set for left hand motion, the front and back slides set for retraction or "out" and the saddle set for motion to the right as shown. It usually happens that for the next stage of operations the major portions of the control elements are desired to be retained in the same positions as in the first stage. With the rock shafts 140 and 140a in locked position, which locks the various control arms in the positions of the first cycle, if the drum is now indexed to bring the second set of control elements 120 and 120a into the same positions as the first ones were, all the elements 120 or 121 of the second set will be positioned in the same axial positions as the corresponding elements of first set. If now it is found that for the second stage a few changes in control settings are desired, the rock shafts 150 are moved to release position, whereupon the particular control arms, the position of which it is desired to change, may be moved by grasping and moving the corresponding handles 135, whereupon the elements 120 and 120a which are in position to control the second stage are moved to the desired axial positions so that thereafter the shafts 150 and 151 being in unlocking position, when the drum is indexed from its first position to its second position, those arms which were heretofore moved during the initial setting operation to different positions from in the first stage will be moved into the second positions automatically. The same situation may be carried through for all the other cycle settings in the different index positions of the shaft 100 with its disks, the control elements 120 and 120a having been initially adjusted to the desired positions for their particular index stages. Thus it is an easy and simple matter in setting up the control mechanism to make changes in only a relatively few places where changes are desired from one to a succeeding indexed position or stage of the control mechanism, after which the control mechanism may be caused to repeat at each rotation throughout the full cycle of operation of the machine.

As shown in the chart of Figure 15, for example, the only changes for the second position or stage over the control positions for the first position are to start the spindle rotation and to start the saddle to the left, and the positions for only two handles have to be changed from starting position. For the next index position only three handles have to be changed from the setting of the second position for the third stage of the cycle. Similarly only the carriage control is changed from the third for the fourth stage, the carriage being now moved in or to the left instead of to the right as previously. In the fifth setting, the carriage is moved to the right and the front cross slide is moved out, which are the only changes over the preceding setting. Similarly, each setting or index position may require only a few changes from the preceding settings to the end of the cycle.

In the particular example shown in Figure 15 all the desired operations are completed, thus completing the machine cycle at the fifteenth setting so that at the sixteenth setting one handle is set to complete the rotation of the control mechanism to the first or starting position without going through the various intermediate steps and stops of indexing. The action of this will appear from the diagram of Figure 5, as will later be explained.

Figure 8:
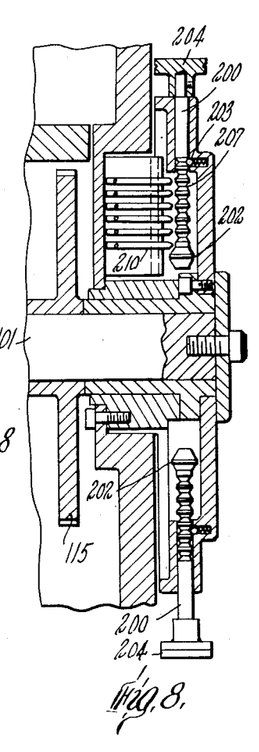

The control mechanism also shows two additional sets of control elements which can be pre-set as desired, though these do not have the advantage of being automatically set from one stage of the cycle to the next. Such means as herein shown comprise a series of axially movable rods 200 shown best in Figures 3, 7 and 8. Each of these rods is provided with a plurality of peripheral grooves 207 and an enlarged diameter end at 202. A spring pressed ball 203 engaging in one or another of the grooves 201 acts to retain each of the rods in any particular axial position in which it may be placed, but the rod may be moved to any other of its positions by exerting sufficient force thereon. Each rod has an actuating knob 204 at its outer end. With this arrangement the enlargement 202 of each rod may be adjusted to any of a plurality of radial positions where as the shaft 101 is indexed, at one angular position it contacts with and rocks any selected of a plurality of bell crank levers 210 (see Figure 7). Rocking of any of these levers moves axially a corresponding actuating rod 211 bearing thereon, tilting a lever 212 fulcrumed on an axis 213 so as to rock the inner end of the corresponding lever 212 downwardly to actuate a switch 215. Thus any of the switches 215 may be actuated selectively at each index position of the shaft 101, depending upon the axial position of the rod 200 then in angular position to engage the corresponding bell crank lever 210.

There may be a set of these axially adjustable rods 200 at each end of the shaft 101 as shown in Figure 3, and the various switches actuated thereby may be employed to control other actions of the machine controlled by the control mechanism as may be found convenient. For example, the stopping positions of the saddle which carries the front and back tool slides may be determined individually at different index positions of the control mechanism by one of the sets of radially adjustable rods, or if desired the carriage may be provided with individual stop limits which are not controlled by the rotation of a lay shaft automatically in sequence but may be controlled by settings of certain of the radially adjustable rods. For example, as shown in Figure 2, there are a plurality of rods 225, each with its own longitudinally stop dog 226 thereon which in different axial positions of the saddle close various stop switches 227. The various switches 215 may be arranged in series with the switches 227 thus determining which of the 227 switches may be effective to close a circuit which may stop the motion of the carriage at any one index position of the control mechanism. Such electric control or stop limits are per se old and well known, so that no description of them appears to be necessary in this case since the invention is not directed to structure of the lathe itself but only to the control mechanism.

Figure 5:
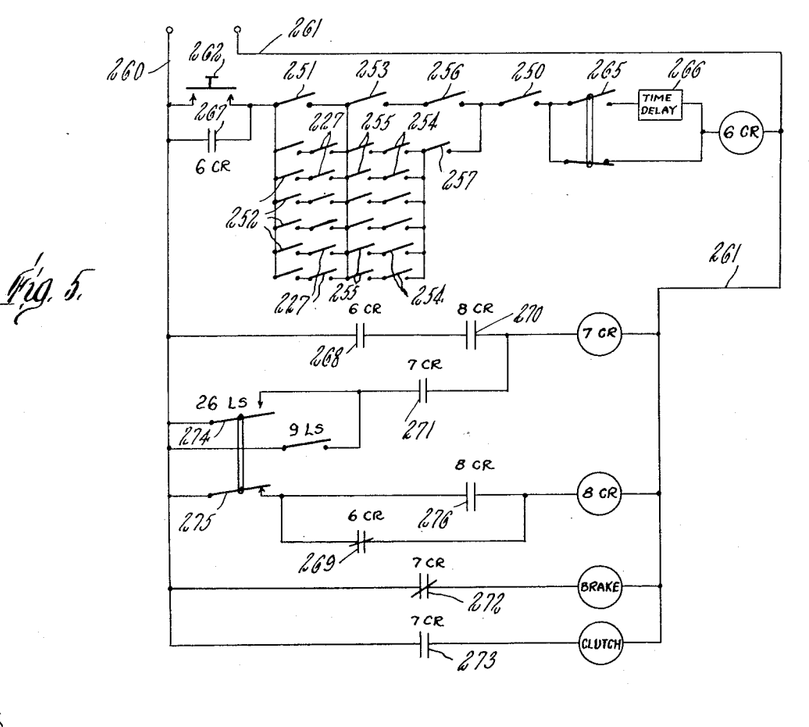
Figure 5 is a wiring diagram.
Figures 6, 7, 9:
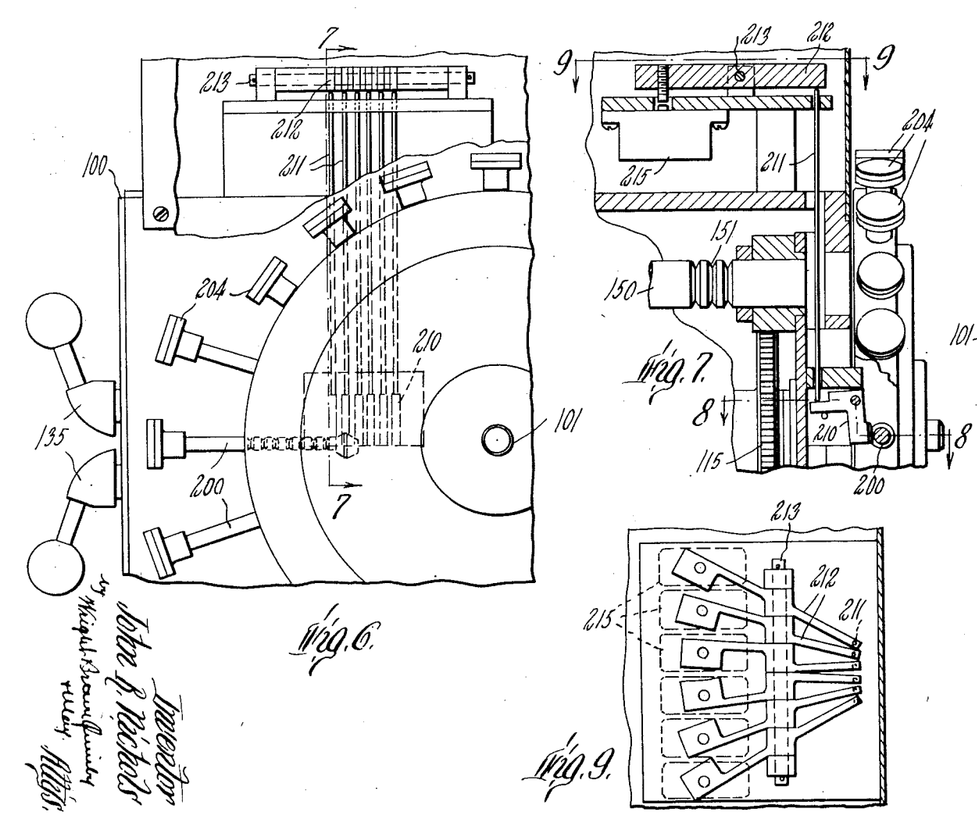
Figure 6 is a fragmentary right end elevation of the control mechanism.
Figure 7 is a detail sectional view on line 7—7 of Figure 6.
Figures 8 and 9 are detail sectional views on lines 8—8 and 9—9, respectively, of Figure 7.

The various controls may be tied in to the lathe as by mechanism shown in the wiring diagram of Figure 5.

It will be assumed that the lathe is provided with a single limit stop switch 250 which is struck by the saddle when it is in fully retracted position. The forward limits of motion of the saddle may be different for the different turret tools which may be presented, but these are controlled independently by the lay shaft as it is turned from one to a succeeding position so that these forward limits of motion are not concerned in the control by the control mechanism of this invention.

It is also assumed that the carriage is provided with one limit switch 251 which determines one limit of its stroke and that the other limit is determined by any selected of the switches 227 as actuated by the selected switch actuator 252, and that the front tool slide is provided with a single retraction or "out" limit switch 253 and any of a selected group of "in" limit switches 254 selected by a particular switch 255 of a series similar to the selective stop mechanism shown for the carriage in Figure 2, and that the rear tool slide is provided with fixed front and rear limit switches 256 and 257. The control mechanism of this invention is to be indexed only after the completion of motions of these parts as controlled by the various limit switches, that is, at and by the completion of all the various functions selected at each index position or stage.

Power for controlling the indexing from the motor 103 which has already been energized is taken from the leads 260 and 261, which, when energized energize the relay 8CR through the closed contact 275 of the switch 26LS, and the closed 6CR switch 269, and as soon as this relay operates it closes the 8CR switch 276 so that it remains energized even after the 6CR switch 269 opens. The switch 26LS is controlled by a cam 277 on the Geneva plate 109 (see Figure 4) which closes a circuit from the line 269 through the switch 262 and that one of the set of switches 252 which is closed by one of the rods 200 at one end of the controlling mechanism making contact at this particular angular index position of the mechanism, whenever the corresponding stop switch 220 in series therewith is closed by the carriage reaching the limit for which it has been set. From there the circuit is closed through any one of the switches 255 which has been selected by a rod 200 at the other end of the mechanism and which closes its switch 255 in series with one of the limit switches 254 which corresponds thereto, and which is closed when the front slide has reached its desired inward limit of motion. The circuit then passes to the limit switch 250 which is closed only when the saddle is in its fully retracted position. Should the carriage be at either limit and the front or back tool slide be at their rearward limits of motion, the switches 251 and 253 will be closed which provides an alternate path to the limit switch 250.

Assuming that one of each of these sets of switches is closed, the position of a double switch 265 then determines whether or not the time delay 266 will be in the circuit, and from there the circuit passes through relay 6CR to the line 261. When the circuit is closed through these various switches by one route or another, the 6CR switch 267 is closed, this providing a holding circuit around the starter switch 262. It also closes a 6CR switch 268 and opens a 6CR switch at 269. The closing of the relay 8CR, as previously described, closes 8CR switch at 270, which with the closing of the 6CR switch 268, energizes the relay 7CR. Energizing of the 7CR switch closes the 7CR switch 271 and opens a 7CR switch at 272 and closes a 7CR switch at 273. The opening of the 7CR switch 272 releases the brake 107 in the indexing motor drive and the closing of the 7CR switch 273 closes the clutch 104 of this drive, thus starting the indexing of the control mechanism. This continues until the limit switch 26LS is actuated by the Geneva cam to de-energize the relay 8CR by opening the switch contact 275 of switch 26LS and also closes a circuit at contact 274. As the relay 7CR is now energized, it continues to be energized through the closed contact at 274 of switch 26LS and the closed 7CR switch 271.

When the indexing is complete, the cam controlled switch 26LS is released to take its position shown in Figure 5, thus de-energizing the 7CR relay. The 7CR switch 272 is then closed to apply the brake 107 and the 7CR switch 273 is opened to open the clutch so that the indexing stops. The control mechanism has now presented a new set of commands.

It will be noted that the time delay 266 may be selectively interposed or not in the circuit energizing the 6CR relay, and this depends upon the position of the upper handle 135 in the upper bank as shown on Figure 3, controlling the double switch 265, being interposed where this handle is in the "on" position and cut out when it is in the "off" position.

When the full number of operations for a complete cycle has been made, herein indicated on Figure 15 as at the 15th index station, the control drum switch 9LS is turned to the "on" position at the 16th index station and is closed, so that when the next indexing action occurs and the relay 6CR is energized, the relay 7CR is energized to release the brake and throw in the clutch, and this condition persists until the control mechanism has been turned to its starting position, whereupon the switch 9LS is broken by the drum return handle being in the "off" position, so that the normal cycle may then be resumed. Thus after the complete cycle of functions has been completed, the control mechanism returns to starting position, passing through all intermediate index positions without stopping. It will be seen from the foregoing description that the various rocking switch actuators such as the handles or levers 135, the axially movable switch actuators 140, the sets of switches 172, 173, and the switches 215 are control devices in the program control mechanism each having a plurality of conditions (the switches being either open or closed and the handles or levers 135 and the switch actuators 140 being movable between different positions), each of such conditions corresponding to a particular control of the machine the action of which is controlled by the program control mechanism.

From the foregoing description of an embodiment of this invention, it should be evident to those skilled in the art that various changes and modifications may be made therein without departing from its spirit or scope.

I claim:

1. A program control mechanism comprising a rotary disk, a series of elements carried by and arranged in circular array about the axis of said disk, each of said elements being movably mounted to take any of a plurality of positions parallel to the axis of said disk, yielding means normally holding each of said elements in any one of said axial positions in which it may be placed but permitting motion of such element under pressure to any of the other of its positions, a control arm rockably supported on an axis perpendicular to the axis of rotation of said disk and adjacent to the periphery of said disk and having portions spaced to permit each of said elements to pass therebetween as said disk is turned and to control the angular position of said arm in accordance with the axial position of such element, means for swinging said arm while one of said elements is between its said portions to move said element axially into a different position corresponding to the angular positioning to which said arm is swung, and means for turning said disk to pass said elements in succession between said arm portions.

2. A program control mechanism comprising a rotary disk, a series of elements carried by and arranged in circular array about the axis of said disk, each of said elements being movably mounted to take any of a plurality of positions parallel to the axis of said disk, yielding means normally holding each of said elements in any one of said axial positions in which it may be placed but permitting motion of such element under pressure to any of the other of its positions, a control arm rockably supported on an axis perpendicular to the axis of rotation of said disk and adjacent to the periphery of said disk and having portions spaced to permit each of said elements to pass therebetween as said disk is turned and to control the angular position of said arm in accordance with the axial position of such element, means for swinging said arm while one of said elements is between its said portions to move said element axially into a different position corresponding to the angular positioning to which said arm is swung, means actuable to lock said arm against swinging motion whereby said elements are positioned to correspond with the locked position of said arm as said elements are moved between said positions, and means for turning said disk to pass said elements in succession between said arm portions.

3. A program control mechanism comprising a rotary shaft, a plurality of disks fixed in spaced parallel relation along said shaft, a series of elements projecting beyond and arranged in circular array about the axis of each disk, each element being movably mounted to take any of a plurality of positions parallel to the axis of said shaft, yielding means normally holding each of said elements in any one of its axial positions in which it may be placed but permitting motion thereof under pressure to any of the others of its positions, a control arm for each disk rockably supported on an axis perpendicular to the axis of said shaft and adjacent to the periphery of its disk and having portions spaced to permit each of the elements of said disk to pass therebetween as said shaft is turned and to control the angular position of said arm in accordance with the position of such element, and means for swinging each arm when one of said elements is in between said portions to thereby move said element axially into a different position corresponding to the angular position into which said arm is so swung.

4. A program control mechanism comprising a rotary shaft, a plurality of disks fixed in spaced parallel relation along said shaft, a series of elements projecting beyond and arranged in circular array about the axis of each disk, each element being movably mounted to take any of a plurality of positions parallel to the axis of said shaft, yielding means normally holding each of said elements in any one of its axial positions in which it may be placed but permitting motion thereof under pressure to any of the others of its positions, a control arm for each disk rockably supported on an axis perpendicular to the axis of said shaft and adjacent to the periphery of its disk and having portions spaced to permit each of the elements of said disk to pass therebetween as said shaft is turned and to control the angular position of said arm in accordance with the position of such element, means for swinging each arm when one of said elements is in between said portions to thereby move said element axially into a different position corresponding to the angular position into which said arm is so swung, and means for indexing said shaft from one to another angular position in each of which one of said elements is between said spaced portions of each of said arms.

5. A program control mechanism comprising a rotary shaft, a plurality of disks fixed in spaced parallel relation along said shaft, a series of elements projecting beyond and arranged in circular array about the axis of each disk, each element being movably mounted to take any of a plurality of positions parallel to the axis of said shaft, yielding means normally holding each of said elements in any one of its axial positions in which it may be placed but permitting motion thereof under pressure to any of the others of its positions, a control arm for each disk rockably supported on an axis perpendicular to the axis of said shaft and adjacent to the periphery of its disk and having portions spaced to permit each of the elements of said disk to pass therebetween as said shaft is turned and to control the angular position of said arm in accordance with the position of such element, means for swinging each arm when one of said elements is in between said portions to thereby move said element axially into a different position corresponding to the angular position into which said arm is so swung, and means actuable to lock all of said arms in the angular positions in which they may be when said locking means is actuated.

6. A program control mechanism comprising a rotary shaft, a plurality of disks fixed in spaced parallel relation along said shaft, a series of elements projecting beyond and arranged in circular array about the axis of each disk, each element being movably mounted to take any of a plurality of positions parallel to the axis of said shaft, yielding means normally holding each of said elements in any one of its axial positions in which it may be placed but permitting motion thereof under pressure to any of the others of its positions, a control arm for each disk rockably supported on an axis perpendicular to the axis of said shaft and adjacent to the periphery of its disk and having portions spaced to permit each of the elements of said disk to pass therebetween as said shaft is turned and to control the angular position of said arm in accordance with the position of such element, means for swinging each arm when one of said elements is in between said portions to thereby move said element axially into a different position corresponding to the angular position into which said arm is so swung, means for indexing said shaft from one to another angular position in each of which one of said elements is between said spaced portions of each of said arms, and means actuable to lock all of said arms in the angular positions in which they may be when said locking means is actuated.

7. A program control mechanism comprising a rotary shaft, a plurality of disks fixed in spaced parallel relation along said shaft, a series of elements projecting beyond and arranged in circular array about the axis of each disk, each element being movably mounted to take any of a plurality of positions parallel to the axis of said shaft, yielding means normally holding each of said elements in any one of its axial positions in which it may be placed but permitting motion thereof under pressure to any of the others of its positions, a control arm for each disk rockably supported on an axis perpendicular to the axis of said shaft and adjacent to the periphery of its disk and having portions spaced to permit each of the elements of said disk to pass therebetween as said shaft is turned and to control the angular position of said arm in accordance with the position of such element, means for swinging each arm when one of said elements is in between said portions to thereby move said element axially into a different position corresponding to the angular position into which said arm is so swung, means actuable to lock all of said arms in the angular positions in which they may be when said locking means is actuated, said locking means comprising a rock shaft having spaced peripheral grooves adapted to receive and retain portions of said arms to lock said arms in adjusted angular positions, said rock shaft having a portion of its periphery between certain of said grooves cut away to permit rocking of said arms from engagement in one to engagement in another of said grooves in one angular position of said rock shaft, and means for rocking said shaft between said locking and arm-releasing positions.

8. A program control mechanism comprising a rotary shaft, a plurality of disks fixed in spaced parallel relation along said shaft, a series of elements projecting beyond and arranged in circular array about the axis of each disk, each element being movably mounted to take any of a plurality of positions parallel to the axis of said shaft, yielding means normally holding each of said elements in any one of its axial positions in which it may be placed but permitting motion thereof under pressure to any of the others of its positions, a control arm for each disk rockably supported on an axis perpendicular to the axis of said shaft and adjacent to the periphery of its disk and having portions spaced to permit each of the elements of said disk to pass therebetween as said shaft is turned and to control the angular position of said arm in accordance with the position of such element, means for swinging each arm when one of said elements is in between said portions to thereby move said element axially into a different position corresponding to the angular position into which said arm is so swung, means for indexing said shaft from one to another angular position in each of which one of said elements is between said spaced portions of each of said arms, means actuable to lock all of said arms in the angular positions in which they may be when said locking means is actuated, said locking means comprising a rock shaft having spaced peripheral grooves adapted to receive and retain portions of said arms to lock said arms in adjusted angular positions, said rock shaft having a portion of its periphery between certain of said grooves cut away to permit rocking of said arms from engagement in one to engagement in another of said grooves in one angular position of said rock shaft, and means for rocking said shaft between said locking and arm-releasing positions.

References Cited in the file of this patent

UNITED STATES PATENTS

| | | |
|---|---|---|
| 1,801,129 | Warren | Apr. 14, 1931 |
| 2,020,877 | Coolidge | Nov. 12, 1935 |
| 2,098,965 | James | Nov. 16, 1937 |
| 2,107,472 | Denison | Feb. 8, 1938 |
| 2,174,331 | Schroeder | Sept. 26, 1939 |
| 2,260,980 | Newell | Oct. 28, 1941 |
| 2,281,139 | Clark | Apr. 28, 1942 |
| 2,725,433 | Reid et al. | Nov. 29, 1955 |